Patented Oct. 27, 1953

2,657,185

UNITED STATES PATENT OFFICE 2,657,185

BLENDS OF ELASTOMERS WITH MODIFIED PHENOLIC RESINS

David W. Young, Roselle, and Raymond G. Newberg, Cranford, N. J., assignors to Standard Oil Development Company, a corporation of Delaware No Drawing. Application August 19, 1948, Serial No. 45,208

11 Claims. (Cl. 260—17.2)

1

This invention relates to plasticized phenolic resins of improved resiliency and flexibility, and more particularly to blends of a certain type of modified phenolic resins with copolymers of the diene-nitrile type.

A limited number of blends of phenol-aldehyde resins with different kinds of rubber have been known in the art previously. However, none of the blends previously known had the unique combination of properties which distinguish the blends of the present invention, the latter having excellent flexibility, unusual extensibility, good abrasion resistance, solvent resistance, and age resistance all at the same time.

It has now been discovered that when the phenolic resin is derived by condensation of an aldehyde such as formaldehyde with a certain type of a phenol having a relatively long aliphatic side chain, the resulting resin can be blended with rubbery diolefin-nitrile polymers to yield products possessing a remarkable combination of properties which make the blend unexpectedly suitable as an artificial leather for shoe sole material, conveyor belting, auto upholstery, handbags and the like. Even more unexpectedly, the novel blends were found to be quite superior in their heat flow characteristics which make them an excellent material for molding large articles such as pieces of furniture, chemical reactor vessels and the like, where it has been known by contrast that phenolic resins of themselves or their previously known blends were not too well suited for the molding of large objects because they tended to set prematurely before filling the mold evenly and, therefore, lead to a large proportion of rejects or resulted in products with rough surfaces requiring expensive polishing operations. The addition of the rubbery copolymers described hereinafter apparently overcomes this disadvantage by retarding the premature cure of the phenolic resin without adversely affecting its final cured properties or usually even improving the latter.

The two principal materials used in the present invention are:

A. A modified phenolic resin obtained by condensing an aldehyde, preferably formaldehyde, with a meta or para hydrocarbon substituted phenol having about 10 to about 21 carbon atoms in the aliphatic hydrocarbon substituent which

2 may be saturated or may have one or two double bonds. Suitable phenols include meta decyl phenol

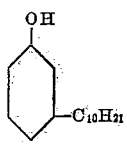

or its homologues up to

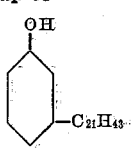

or the corresponding para substituted analogue; or preferably the corresponding unsaturated analogues such as cardanol may be obtained by alkylating phenol with polypropylene having 12 to 21 carbon atoms per molecule. However, a particularly useful unsaturated alkylated phenolic material is cardanol to which the formula

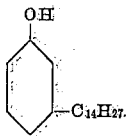

has been assigned and which is obtained by distillation of cashew nut shell oil (as described in Industrial and Engineering Chemistry, volume 32, page 1309, October 1940); and still another excellent material is anacardic acid (ether extract of cashew nut shells), which is believed to possess a diolefinic substitution group; or the phenolic liquid obtainable by polymerizing cashew nut shell liquid at moderate temperatures with the help of an alkyl sulfate can likewise be used for the aldehyde condensation.

The phenol-aldehyde condensation reaction is carried out in the usual, known manner at temperatures ranging from 60° C. to 150° C., the heating usually being accomplished by a steam jacket maintained at about 100° C. to 120° C.; and using the usual known basic or acid catalysts, e. g., sodium hydroxide or sulfuric acid; the condensation products being dehydrated in the latter stages of the reaction at temperatures of about 110° C. to 150° C. to form a fusible resin.

The condensation reaction is capable of control by the usual adjustment of pH value and/or condensation temperature. Furthermore, for the purposes of the present invention the modified phenolic or condensation polymer may contain an activator, e. g., 2 to 10 percent of hexamethylene tetramine (which yields formaldehyde on further heating) if fast curing blends of high tensile strength are required. All of these resins are fluid when heated to about 80° C., some being liquid even at room temperature. These condensation polymers of formaldehyde with a substituted phenol having 10 to 21 carbon atoms in the aliphatic substituent will hereafter be referred for brevity's sake as "long chain alkyl phenolic resins," it being understood that the aliphatic substituent may be a saturated alkyl group or an unsaturated hydrocarbon radical.

B. The other principal material used in the blends of the invention is an elastomer prepared by copolymerizing in aqueous emulsion 20 to 35 or 40 parts of acrylonitrile or methyacrylonitrile, with 80 to 65 or 60 parts of a conjugated diolefin of 4 to 6 carbon atoms such as butadiene-1,3, isoprene or dimethyl butadiene. As is well known, in preparing these elastomers the preferred monomers such as butadiene and acrylonitrile are emulsified in water or other aqueous medium with the help of an emulsifier such as sodium oleate or other alkali soap of a higher fatty acid, or with the help of synthetic dispersing agents of the sulfonate type, and the emulsion is thereafter polymerized at temperatures between about 10 and 65° C. in the presence of an oxygen-yielding catalyst such as hydrogen peroxide, benzoyl peroxide, potassium persulfate or other alkali metal persulfates or perborates or mixtures thereof. Usually, it is also desirable to add to the polymerizable mixture a minor amount of a polymerization modifier, e. g., a mercaptan of 6 to 18 carbon atoms such as lauryl mercaptan, or a commercial mixture of mercaptans known as "Lorol" mercaptan which consists predominantly of lauryl mercaptan with minor amounts of other mercaptans in the C6 to C18 range. The polymerization is normally continued until about 70 to 95 percent of the monomers are converted to form the desired copolymers, which usually have a Mooney viscosity of 60 to 100 as determined by the use of a large rotor (2 minutes at 100° C.). For the sake of brevity, these known copolymers will hereinafter be referred to simply as diene-nitrile elastomers. However, for certain purposes it is also possible to use oily copolymers of the diolefin-nitrile type, instead of the rubbery copolymers just described.

The following specific examples will serve to illustrate the unexpected advantages of the present invention, although it will be understood of course that many modifications or variations of these examples are possible without departing from the scope of the invention.

Example I

In this and all following illustrative examples, unless otherwise specified, the novel blends were prepared by first breaking down the diene-nitrile polymer on differential rolls at 40° C. (four passes) and then milling in the liquid or solid phenolic resins on a rubber mill at 55° C. over a period of 15 minutes. Milling temperatures between 45° C. and 65° C. are generally desirable in dealing with this type of thermosetting resins, since these tend to cure or "scorch" at temperatures higher than about 80° C. The blended stocks were then cured for 15 minutes at 163° C. in a standard ASTM four-cavity mold (D-15-41) yielding slabs 6" x 6" x 0.075", all stocks being cured between cellophane to eliminate possible adhesion to the molds. Test specimens were cut from the resulting rubbery or leathery stocks and when tested gave the following results:

TABLE I

| Blend | 0 | 1 | 2 | 3 | 4 | 5 | 6 | 7 | 8 | 9 | 10 |
|---|---|---|---|---|---|---|---|---|---|---|---|
| Nitrile-butadiene elastomer,[1] parts (35% combined acrylonitrile) | 100 | 90 | 90 | 80 | 80 | 70 | 70 | 60 | 60 | 50 | 50 |
| Ordinary modified phenolic resin, parts [2] | | 10 | | 20 | | 30 | | 40 | | 50 | |
| Long-chain alkyl phenolic resin, parts [3] | | | 10 | | 20 | | 30 | | 40 | | 50 |
| Tensile strength, lbs./sq. in | 300 | 700 | 400 | 1,150 | 600 | 1,650 | 1,200 | 2,150 | 1,950 | 3,300 | 2,800 |
| Elongation, percent | 510 | 470 | 475 | 400 | 415 | 300 | 350 | 200 | 260 | 100 | 180 |
| Tear strength, lbs./inch (ASTM D-624-44) | 110 | 55 | 50 | 130 | 110 | 310 | 200 | 620 | 580 | 720 | 680 |
| Shore hardness ("A" durometer) (ASTM D-676-44T) | 30 | | | 55 | 50 | | | 90 | 80 | 95 | 85 |
| Stiffness, lbs./sq. in. ×10³ (ASTM D-747-48T) | | | | 0 | 0 | 5 | 0 | 22 | 12 | 42 | 33 |
| Brittleness, ° C. (ASTM D-624-44) | | | | −40 | −45.6 | | | −34.4 | −35.7 | −29 | −29 |

[1] Perbunan 35 NS; uncured.
[2] Durez 12687 (condensation product of formaldehyde and tertiary butyl phenol).
[3] Cardolite 904 (condensation product of formaldehyde and cardanol; contains about 5% of added hexamethylenetetramine)

From the data summarized in Table I, it can be seen that the novel blends of nitrile-diene elastomers with the long-chain alkyl phenolic resins have satisfactory properties, in many respects comparable to blends of the same elastomers with ordinary unmodified or even the low-alkyl modified phenolic resins. Thus, the cured blends containing up to about 50 percent of resin by weight resemble vulcanized rubber having tensile strength between about 400 and 3500 lbs./sq. inch. Furthermore, it can be observed from the data of Table I that the novel blends containing less than about 30 percent of the long-chain alkyl phenolic resin are very substantially weaker than the analogous control blends of the unmodified or low-alkyl modified phenolics and have very nearly the same elongation as the latter. However, quite surprisingly, at the critical limit of about 30 percent resin content and higher, the novel blends containing the long-chain alkyl phenolic resin become very much more extensible than the analogous control blends, while at the same time attaining a tensile strength only slightly inferior to that of the latter.

This unexpected effect of the long-chain alkyl phenolics when used in proportions above the critical limit is brought out clearly by a comparison of blends lying on either side of the critical limit, e. g., of the 20%—blends 3 and 4, with the 30%—blends 5 and 6. Such a comparison shows that blend 4, having an elongation which is greater by only 15 points in 400 than control blend 3, has a rather poor tensile strength well below 1000 lbs./sq. inch, and only about one-half that of blend 3; in contrast, blend 6 having an elongation which is greater by 50 points in 300 than control blend 5, has a good tensile strength well above 1000 lbs./sq. inch and only about 27 percent lower than the tensile strength of the control blend. An even more striking difference is brought out by comparing the 50%—blends 9 and 10; the latter having almost twice the elongation of the former, while at the same time having the excellent tensile strength of 2800 lbs./sq. inch, which is only 15% lower than the control blend 9.

This difference in properties due to the use of the long-chain alkyl phenolic resins in elastomer blends, represents a very significant improvement especially where the blends are to be used for high steam pressure expansion gaskets, or as gaskets in pipelines subject to thermal or other expansion; or in articles flexible at low temperatures. Another important advantage of the novel blends of elastomer and resin is inherent in the fact that they can be cured by heat and in the absence of sulfur, the phenolic resin by itself apparently causing the elastomer to cure by a mechanism not yet satisfactorily explained. When the novel blends are cured in the absence of sulfur, they yield products which not only possess excellent tensile strength comparable to that of similar blends employing unmodified or low-alkyl modified phenolic resins, but which at the same time possess remarkable extensibility even when the resin is contained in the blend in concentrations of 50 to 70 percent, whereas similar blends of the unmodified or low-alkyl modified phenolic resins become very nearly rigid at resin concentrations at or above 50 percent. This combination of high strength of at least about 2500 to 3500 lbs./sq. inch, substantial ultimate elongation of at least about 150% to 300% and total absence of sulfur is of obvious importance where strong flexible products are required as gaskets or the like in conveying or containing fine liquid chemicals which must be preserved free from sulfur.

Example II

Where sulfur is not objectionable in the final product, conventional rubber compounding ingredients may also be advantageously used in the novel elastomer-resin blends with interesting results. In this example, blends of varying elastomer-resin proportions were prepared in accordance wtih the following basic formula:

|  | Parts by weight |
|---|---|
| Phenolic resin plus diene-nitrile elastomer (variable proportions) | 100 |
| Zinc oxide | 5 |
| Stearic acid | 1 |
| Sulfur | 2 |
| N-cyclohexyl-2-benzothiazole sulfenamide | 1 |

The results obtained upon curing the various compounds for 15 minutes at 163° C. are summarized in Table II.

TABLE II

| Blend series | Run | 11 | 12 | 13 | 14 | 15 | 16 | 17 | 18 | 19 | 20 | 21 | 22 | 23 |
|---|---|---|---|---|---|---|---|---|---|---|---|---|---|---|
| 0 | Nitrile-butadiene elastomer [1], parts | 100 | 90 | 90 | 90 | 66⅔ | 66⅔ | 66⅔ | 50 | 50 | 50 | 33⅓ | 33⅓ | 33⅓ |
| 1 | Ordinary modified phenolic resin [2], parts | | 10 | | | 33⅓ | | | 50 | | | 66⅔ | | |
| 2 | Long-chain alkyl phenolic resin [3], parts | | | 10 | | | 33⅓ | | | 50 | | | 66⅔ | |
| 3 | Long-chain alkyl phenolci resin [4], parts | | | | 10 | | | 33⅓ | | | 50 | | | 66⅔ |
| | Tensile strength, lbs./sq. inch | 500 | 1,100 | 1,000 | 600 | 2,900 | 1,500 | 1,000 | 5,000 | 3,000 | 1,500 | 6,000 | 4,700 | 1,800 |
| | Elongation, percent | 750 | 710 | 710 | 680 | 300 | 500 | 600 | 80 | 280 | 480 | 20 | 100 | 360 |
| | Ultimate elasticity factor [5], 10², in. lbs./cu. in | 37.5 | 78 | 71 | 41 | 87 | 75 | 60 | 40 | 84 | 72 | 12 | 47 | 65 |

Footnotes 1, 2, and 3 same as 1, 2, and 3 of Table I.
[4] Cardolite 899 (no hexamethylene tetramine).
[5] The ultimate elasticity factor is the product of ultimate tensile strength expressed in lbs./sq. in. multiplied by ultimate elongation expressed in inch/inch, and is a measure of elastic energy per unit volume.

The results shown in Table II again clearly indicate the entirely unexpected superiority in terms of elongation or extensibility of the long-chain alkyl phenolic resin in concentrations of at least 30 percent in rubber-resin blends, as compared to the extensibility of blends containing ordinary unalkylated or even short-chain alkylated phenolic resins. In high resin concentrations, the extensibility of the novel blends is especially outstanding, cured blends of Run 23 containing as much as a two-to-one ratio of long-chain alkyl phenolic resin to rubber being shown to possess an elongation of 360% as compared to the very slight elongation of 20% exhibited by the corresponding blend of Run 21 containing the ordinary phenolic resin.

Moreover, with the long-chain alkylated phenolics, it is possible to use blends much richer in resin content and still obtain compounds of excellent elongation and tensile strength. This is shown by a comparison of Runs 15 and 19, wherein the latter containing 50% of long-chain alkylated resin, has substantially identical tensile properties as the former which contains only 33⅓% of phenolic resin. It can be seen that the novel blends can be formulated to yield compounds possessed of an unusual combination of properties, that is, a resin content of 35 to 70%, an elongation of at least 250% to 800% and an ultimate elasticity factor of at least 4000 inch pounds/in.³, the simultaneous presence of the stipulated high elongation and relatively high elasticity factor being indicative of good tensile strength and good extensibility or low stiffness. The possibility of thus using higher concentrations of the relatively cheap long-chain alkylated phenolic resin to replace some of the fairly expensive diene-nitrile elastomer, without any major sacrifice in the elastic properties of the cured compound, is, of course, of great economic significance.

Another interesting result disclosed by Table II is that while the highly extensible cured blends of nitrile rubber with the long-chain alkyl phenolic resins of series 3 are weaker in tensile strength than the corresponding blends of ordinary phenolics, this difference can be decreased substantially by selecting a long-chain alkyl phenolic resin containing an activator such as hexamethylene tetramine which liberates formaldehyde on heating and thus causes a more advanced cure of the resin on heating as shown by the blends of series 2. Thereby the eventual tensile strength can be increased very substantially, though at the same time some reduction of ultimate elongation will result likewise.

It is also interesting to compare the results of Table II, series 2, with the results of Table I, the comparison showing that a significant increase in both tensile strength and ultimate elongation can be obtained by adding vulcanizing agents for the elastomer component to the blend prior to curing.

Furthermore, the different results illustrate how a resin blend possessing the best balance of desired properties can be formulated for any given purpose. Thus, a desired shift in properties can be achieved by changing one or more of the following principal variables: ratio of elastomer to resin; presence or absence of usual curing agents for the rubbery constituent; presence or absence of fillers and/or plasticizers; and presence or absence of a curing aid for the long-chain alkyl phenolic resin such as hexamethylene tetramine or a free aldehyde. The rubber curing agents may be any of the known materials used for this purpose, e. g., 1 to 5 weight percent of sulfur, 0.2 to 3 weight percent of organic vulcanization accelerators such as benzothiazyl disulfide, tetramethyl thiuram disulfide, N-cyclohexyl-2-benzothiazole sulfenamide, diphenyl guanidine, zinc diethyl dithiocarbamate, etc.

The usual auxiliary compounding and curing aids, fillers, pigments, anti-oxidants and dyes may also be present. Compounds typical of the aforementioned classes are higher fatty acids, such as stearic acid, which may be present in amounts ranging from 0.5 to 5 percent based on the total blend; 0.5 to 60 percent or preferably one to 5 percent of basic metal oxides in the form of zinc oxide, lead oxide, magnesia, basic lead oxide, basic lead carbonate, lead silicate, and hydrated lime. Carbon black, mica, talc, barytes, clay, asbestos, lithopone, cotton and wood fibres, wood flour, etc., may likewise be used in conjunction with the blends of the present invention. Furthermore, many plasticizers, such as dibutyl phthalate, dioctyl phthalate, trimethyl phosphate, various hydrocarbon polymers, such as solid copolymers of styrene with approximately equal amounts of isobutylene prepared by Friedel-Crafts polymerization at temperatures below about −70° F., are also useful for modifying the blends of the present invention; the particular advantages of the styrene-isobutylene polymers being described and claimed in copending application Serial No. 48,752, filed September 10, 1948. The blended compounds are usually cured in molds at temperatures between 90 and 180° C. for periods ranging from 2 minutes to 60 minutes, or preferably for 10 to 20 minutes at 150 to 165° C.

*Example III*

The final properties of the novel compounds can also be varied by selecting a diene-nitrile elastomer of any particular nitrile content. The effect of acrylonitrile content on the properties of the blend is illustrated by the following.

Two stocks were prepared according to the following recipe:

| | Parts by weight |
|---|---|
| Butadiene-acrylonitrile emulsion copolymer | 100 |
| Long-chain alkyl phenolic resin containing 5% hexamethylene tetramine (Cardolite 904) | 50 |
| Zinc oxide | 5 |
| Sulfur | 1.5 |
| Stearic acid | 1.5 |
| Benzothiazyl disulfide | 1.5 |

The two stocks were identical in composition except that the diene-nitrile copolymer of stock A had a combined acrylonitrile content of 26% (Perbunan 26 NS 95), whereas the corresponding copolymer of stock B had a combined nitrile content of 35% (Perbunan 35 NS 90). When tested the two stocks were characterized by the following properties:

TABLE III

| Stock | A (26% nitrile) | | B (35% nitrile) | |
|---|---|---|---|---|
| | Original | Oven aged for 70 hours at 212° F. | Original | Oven aged for 70 hours at 212° F. |
| Shore hardness | 84 | 84 | 81 | 84 |
| Tensile strength, lbs./sq. in | 1,200 | 1,140 | 1,600 | 1,530 |
| Elongation, percent | 350 | 210 | 430 | 250 |
| Modulus at 100% elongation, lbs./sq. inch | 620 | -------- | 620 | -------- |
| Specific gravity | 1.079 | -------- | 1.093 | -------- |
| Crescent tear resistance, lbs./inch | 270 | -------- | 290 | -------- |
| Brittle temperature, ° C. (ASTM D–746–44T) | −34.5 | -------- | −23.5 | -------- |
| Stiffness in flex at 24° C., lbs./sq. inch (ASTM D–747–43T) | 3,240 | -------- | 3,760 | -------- |
| Immersed at room temperature, hours | 24 | 168 | 24 | 168 |
| Volume increase, percent in: | | | | |
| ASTM reference fuel No. 1 | 2.2 | 5.7 | 0.9 | 2.7 |
| ASTM reference fuel No. 2 | 42.7 | 62.1 | 35.5 | 43.8 |
| ASTM oil No. 3 | 0.7 | 1.3 | 0.4 | 0.6 |
| Water | 0.6 | 1.8 | 0.8 | 1.9 |

The above data illustrate that an increase in the nitrile content of the diene-nitrile elastomer contributes significantly to an improvement in tensile properties of the blend, the tensile strength as well as the elongation of the 35%-nitrile stock being greater than the corresponding values for the 26%-nitrile stock. Furthermore, the high nitrile stock also shows substantially better resistance to tear and to hydrocarbon solvents. On the other hand, the low nitrile stock is superior in regard to low temperature properties, water resistance and resistance to polar solvents generally, and is also characterized by a lower flex stiffness.

*Example IV*

Blends of up to about 50% resin content are rubbery or leathery in character. However, analogous blends of a predominantly rigid and structurally strong character suitable for molding radio cabinets, filing cabinets, furniture generally, tool handles, automobile fenders, and the like can also be formulated, the presence of the rubbery diene-nitrile polymer having a highly beneficial effect on the impact strength and brittle temperature of the blends.

Blends illustrative of compositions suitable for molding were compounded in the usual manner and their properties were determined on molded slabs preformed at 104° C. and 1200 lbs./sq. in. ram pressure and cured 20 minutes at 163° C. The results obtained are summarized below.

TABLE IV

| Compound | 1 | 2 | 3 | 4 | 5 |
|---|---|---|---|---|---|
| Long-chain Alkylated Phenolic resin,[1] parts by weight | 100 | 90 | 90 | 80 | 80 |
| 74% butadiene-26% acrylonitrile copolymer,[2] parts by weight | | 10 | | 20 | |
| 65% butadiene-35% acrylonitrile copolymer,[3] parts by weight | | | 10 | | 20 |
| Woodflour, parts by weight | 50 | 50 | 50 | 50 | 50 |
| Hexamethylene tetramine, parts by weight | 4 | 4 | 4 | 4 | 4 |
| Izod impact strength, ft. lbs./inch of notch | 0.490 | 0.542 | 0.580 | 0.629 | 0.697 |
| Tensil strength, lbs./sq. inch | 4,760 | 4,280 | 4,740 | 3,910 | 4,600 |
| Flexural strength, lbs./sq. inch | 8,920 | 7,670 | 8,710 | 7,120 | 7,830 |
| Compression strength, lbs./sq. inch | 33,100 | 21,600 | 25,640 | 17,100 | 18,200 |
| Percent compression | 12.8 | 12.4 | 12.3 | 11.7 | 11.1 |
| Rockwell hardness (M scale) | 121 | 86 | 110 | 72 | 86 |

[1] Cardolite 904.
[2] Perbunan 26 NS 90.
[3] Perbunan 35 NS 90.

The foregoing results illustrate the very substantial improvement of impact strength obtained by adding a minor amount of rubbery nitrile-diene polymer to the phenolic resin.

In addition to the uses previously described, the novel blends can also be dissolved in methyl ethyl ketone or other solvents capable of dissolving the phenolic resin as well as the elastomer, to reduce the blend to a consistency of putty or even to brushing consistency, and the resulting mixture or solution can be applied as an adherent layer to metal or other surfaces to protect them from corrosion and other adverse effects. Still other modifications of and uses for the compounds described hereinbefore will be thought of by persons skilled in the art without departing from the inventive concept claimed, and it is to be understood that the foregoing examples have been set forth hereinabove only as illustrations, but not as limitations of the invention defined in the appended claims.

We claim:

1. A composition of matter comprising 30 to 60 parts of a resin prepared by condensing formaldehyde with an aliphatically substituted phenol having as its only substituent a $C_{10}$ to $C_{21}$ hydrocarbon side chain selected from the group consisting of alkyl radicals, monoolefinic radicals and diolefinic radicals; in combination with 70 to 40 parts of a solid rubbery copolymer of 20 to 35 percent of acrylonitrile and 80 to 65 percent of butadiene-1,3, the resin having been incorporated in the copolymer while the resin was in a fusible state.

2. An extensible composition of matter comprising 30 to 45 parts of a fusible resin prepared by condensing formaldehyde with cashew nut shell oil and 70 to 55 parts of a solid rubbery copolymer of 25 to 35 percent of acrylonitrile and 75 to 65 percent of butadiene-1,3.

3. A cured, sulfur-free extensible composition of matter comprising 50 to 70 parts of a resin prepared by condensing formaldehyde with a phenol having as its substituent, a mono-ethylenically unsaturated hydrocarbon side chain of from 10 to 21 carbon atoms and 50 to 30 parts of a solid rubbery copolymer of 20 to 26 percent of acrylonitrile and 80 to 74 percent of butadiene-1,3, the resin having been mixed with the copolymer while the resin was in a fusible state; said composition being characterized by an ultimate elongation of at least 150 to 250 percent and a tensile strength of 2500 to 3500 pounds per square inch.

4. A cured composition of matter comprising 30 to 70 parts of a resin prepared by condensing formaldehyde with distilled cashew nut shell oil; 70 to 55 parts of a solid rubbery copolymer of 20 to 35 percent of acrylonitrile and 80 to 65 percent of butadiene; and 1 to 5 parts of sulfur.

5. A cured composition of matter comprising 35 to 70 parts by weight of a resin prepared by condensing formaldehyde with distilled cashew nut shell oil; 65 to 30 parts by weight of a solid rubbery copolymer of about 26 percent of acrylonitrile and about 74 percent of butadiene; and 1 to 5 parts by weight of sulfur and a vulcanization accelerator; said composition being characterized by an ultimate elongation of 250 to 800 percent and an ultimate elasticity factor of at least 4000 inch pounds per cubic inch.

6. A cured composition of matter comprising 100 parts of a solid rubbery copolymer of 25 to 35 percent of acrylonitrile and 75 to 65 percent of butadiene-1,3; 50 parts of a resin prepared by condensing one mol proportion of formaldehyde and 0.75 to 1.5 mol proportions of cardanol; 5 parts of zinc oxide; 1.5 parts of sulfur, 1.5 parts of stearic acid and 1.5 parts of benzothiazyl disulfide; said composition being characterized by a tensile strength between 1200 to 1600 lbs./sq. inch, an elongation between 350 and 430 percent, and brittle temperature between —20° C. and —35° C.

7. A method comprising mixing at a temperature between 45° C. and 65° C., 30 to 60 parts of a reactive fusible resin prepared by condensing formaldehyde with a phenol having a monoethylenically unsaturated side chain of 10 to 21 carbon atoms in the meta position, and 70 to 40 parts of a solid rubbery copolymer of 20 to 35 percent of acrylonitrile and 80 to 65 percent of butadiene, and curing the resulting mixture in the absence of any sulfur curing agent for the rubbery copolymer as well as any aldehyde curing aid for the resin at a temperature between 150 and 180° C.

8. A method according to claim 7 wherein the reactive resin is essentially a condensation product of formaldehyde with cardanol and contains between 5 and 10 percent of its weight of hexamethylene tetramine.

9. A method comprising mill mixing at a temperature between 50° C. and 60° C., 30 to 45 parts of a fusible resin prepared by condensing formaldehyde with cashew nut shell oil, 70 to 55 parts of a solid rubbery copolymer of 25 to 35 percent of acrylonitrile and 75 to 65 percent of butadiene, 1 to 5 parts of sulfur, 0.2 to 3 parts of an organic vulcanization accelerator, 1 to 5 parts of zinc oxide and 0.5 to 5 parts of stearic acid; and curing the resulting mixture at a temperature between 150 and 180° C. for a period of 2 to 60 minutes.

10. A composition of matter which comprises about 90 parts of a resin prepared by condensing formaldehyde with cashew nut shell oil, about 10 parts of a rubbery copolymer of about 65% butadiene and 35% of acrylonitrile and about 50 parts of woodflour.

11. A composition of matter comprising 30 to 90 parts of a fusible aliphatically substituted phenol-formaldehyde condensation resin wherein each aromatic ring of the condensation product has a sole hydrocarbon substituent of from 10 to 21 carbon atoms selected from the group consisting of alkylated radicals, mono-olefinic radicals and diolefinic radicals and 70 to 10 parts of a copolymer of 20 to 35% of acrylonitrile and 80 to 65% of a conjugated butadiene hydrocarbon of from 4 to 6 carbon atoms per molecule.

DAVID W. YOUNG.
RAYMOND G. NEWBERG.

References Cited in the file of this patent

UNITED STATES PATENTS

| Number | Name | Date |
|---|---|---|
| 2,310,077 | Harvey | Feb. 2, 1943 |
| 2,325,981 | Sarbach | Aug. 3, 1943 |
| 2,441,860 | Whetstone | May 18, 1948 |
| 2,452,374 | Harvey | Oct. 26, 1948 |
| 2,459,739 | Groten et al. | Jan. 18, 1949 |
| 2,532,374 | Shepard | Dec. 5, 1950 |

OTHER REFERENCES

Newberg et al., Rubber Age, February 1948, pp. 533–539.

Morgan Paint Manufacture, March 1945, pages 73–75.

Cardolite, pub. 1947 by Irvington Varnish and Insulator Co., Irvington, N. J., pages 1, 2 and 4.